(12) United States Patent
Poisner

(10) Patent No.: US 6,581,173 B2
(45) Date of Patent: Jun. 17, 2003

(54) METHOD AND APPARATUS FOR VERIFYING THAT DATA STORED IN A MEMORY HAS NOT BEEN CORRUPTED

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/844,927

(22) Filed: Apr. 26, 2001

(65) Prior Publication Data

US 2001/0016927 A1 Aug. 23, 2001

Related U.S. Application Data

(63) Continuation of application No. 09/107,649, filed on Jun. 30, 1998, now Pat. No. 6,247,151.

(51) Int. Cl.$^7$ ................................................ G11C 29/00
(52) U.S. Cl. ...................................... 714/718; 365/201
(58) Field of Search ...................................... 714/43, 54

(56) References Cited

U.S. PATENT DOCUMENTS

| 4,750,181 A | 6/1988 | McDonald et al. ......... 714/824 |
| 5,278,839 A | 1/1994 | Matsumoto et al. ........ 714/710 |
| 5,331,644 A | 7/1994 | Ishii et al. .................. 714/736 |
| 5,410,547 A | 4/1995 | Drain ......................... 714/732 |
| 5,442,645 A | 8/1995 | Ugon et al. ................. 714/736 |
| 5,461,634 A | 10/1995 | McGrath et al. ............ 714/819 |
| 5,523,972 A | 6/1996 | Rashid et al. .......... 365/185.22 |
| 5,617,531 A | 4/1997 | Crouch et al. ................ 714/30 |
| 5,689,514 A | 11/1997 | Saitoh ........................ 714/719 |
| 5,815,509 A | 9/1998 | Deng et al. ................. 714/719 |
| 5,925,129 A | 7/1999 | Combs et al. .............. 713/300 |

OTHER PUBLICATIONS

Howe, L. D. et al., Destination Checking of Memory Arrays, IBM Technical Disclosure Bulletin, vol. 16, Issue No. 6, 11, 1973, p. 1763–1764.*

Burk e, Diagnostic Mode, IBM Technical Disclosure Bulletin, vol. 13, Issue No. 3, Aug. 1970, pp. 655–656.*

* cited by examiner

*Primary Examiner*—Albert Decady
*Assistant Examiner*—Shelly A Chase
(74) *Attorney, Agent, or Firm*—Cynthia T. Faatz

(57) ABSTRACT

An integrated circuit device includes dedicated memory verification logic to compare data read from a set of cells in a memory at a first time to data read from the same set of memory cells at a second time.

17 Claims, 6 Drawing Sheets

METHOD AND APPARATUS FOR VERIFYING THAT DATA STORED IN A MEMORY HAS NOT BEEN CORRUPTED

CROSS-REFERENCE TO RELATED APPLICATIONS

The present application is a continuation of U.S. patent application Ser. No. 09/107,649 of the same title, filed Jun. 30, 1998, now issued as U.S. Pat. No. 6,247,151 and assigned to the same assignee.

BACKGROUND OF THE INVENTION

1. Field of the Invention

The present invention relates to the field of data integrity in a memory, and more particularly, to the field of verification of the integrity of memory contents.

2. Discussion of Related Art

It is important for reliable system operation to ensure that data stored in a memory is not corrupted.

There are several different events that have the potential to cause memory corruption. Some computer systems, for example, may provide the capability to enter a suspended state either on command, or following a timeout period. During the suspended state, only certain parts of the system are powered.

It is important to provide continuous and sufficient power to volatile memories in the system in order for the memories to reliably maintain the information stored therein. If the power to a memory or a cell within the memory is interrupted or insufficient during the suspended state, some of the data stored in the memory may be corrupted.

Systems that include the capability to enter a suspended or low power mode typically include software that is executed by a processor prior to the system entering the suspended state to preserve the context of the computer system. Along with saving the context of the system, the software may also include a routine that provides a signature or other indicator of the information stored in main memory at that time.

The signature or indicator may be a checksum or a cyclic redundancy checking (CRC) code, for example. The checksum or CRC code is generated based on data read from predetermined memory cells in the memory to be verified.

Upon exiting the suspended state, once the processor is reset, the processor reads data from the same memory locations and executes the same routine to provide a second signature or indicator of the information stored in the main memory. The second, post-suspend signature is compared to the first, pre-suspend signature to determine whether the information stored in the main memory was corrupted during the suspended state.

A disadvantage of this approach is that the integrity of the main memory cannot be verified until the processor is completely reset. This can cause a delay in resuming system operation after exiting the suspended state.

Another disadvantage of this approach in a computer system is that the processor cannot execute code from the main memory until the verification process is complete. The basic input/output system (BIOS) routine, for example, may be executed from electrically programmable read-only memory (EPROM) instead of the main memory. The datapath from the processor to the EPROM is often narrower than the datapath from the processor to the main memory thereby slowing down execution of the BIOS routine.

A further disadvantage of this approach is that the processing overhead involved in executing the software memory verification routine may unnecessarily slow down the memory verification process.

SUMMARY OF THE INVENTION

A method and apparatus for verifying that data stored in a memory has not been corrupted are described.

For one embodiment, an integrated circuit device includes dedicated memory verification logic to compare data read from a set of cells in a memory at a first time to data read from the same set of memory cells at a second time.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method and apparatus for verifying that data stored in a memory has not been corrupted are described. While the embodiments below describe a method and apparatus for verifying the integrity of a main memory in a computer system, other embodiments are applicable to other types of memories and/or other types of systems.

For one embodiment, dedicated memory verification logic is provided such that the integrity of a memory can be verified quickly. The dedicated memory verification logic of one embodiment provides the capability to begin verifying the integrity of a memory before a processor is reset following a suspend operation. Other features of various embodiments will be appreciated from the following description.

For one embodiment, an integrated circuit device includes dedicated memory verification logic to compare data read from a set of cells in a memory at a first time to data read from the same set of memory cells at a second time.

Figure 1:
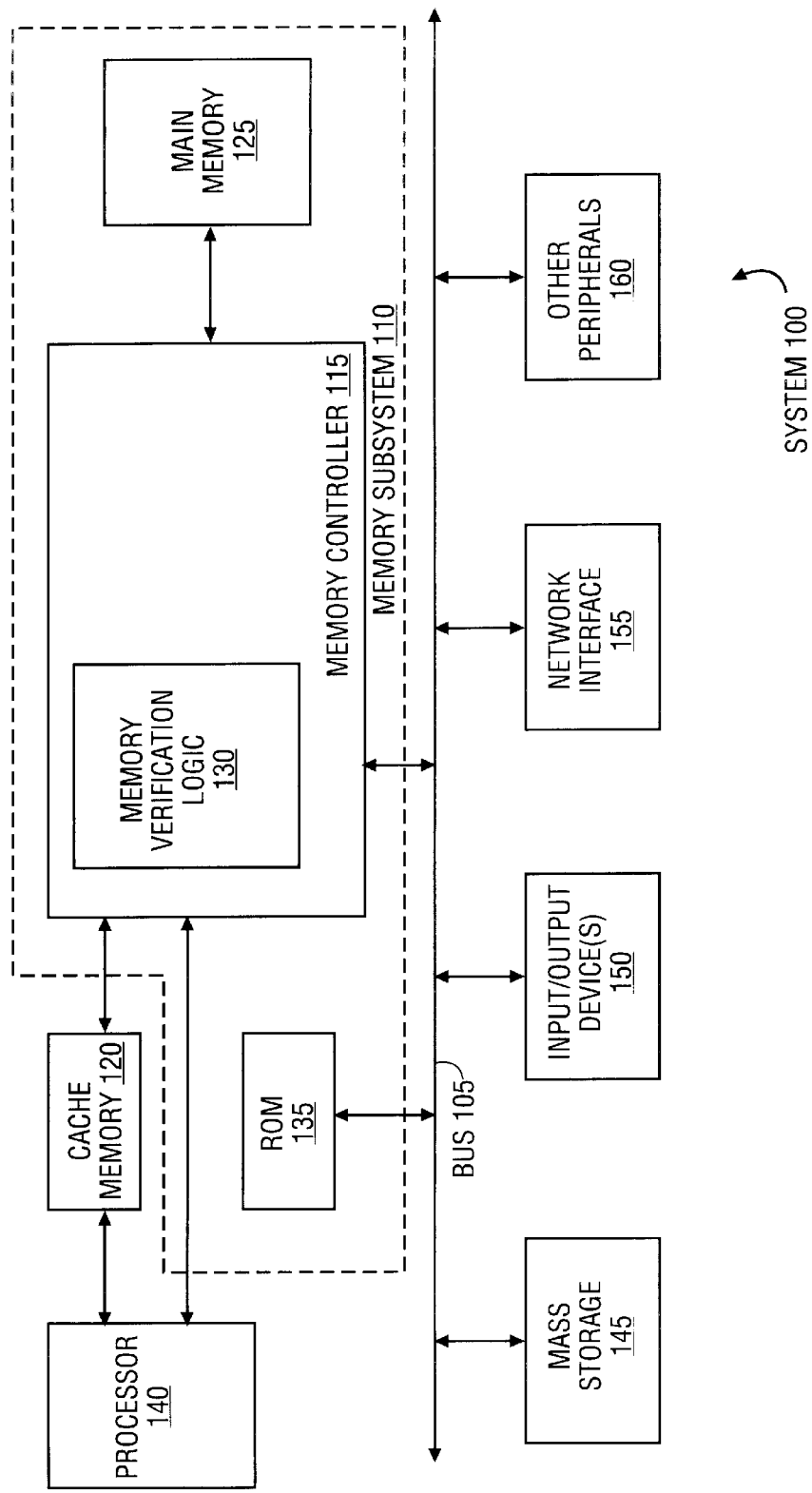
FIG. 1 is a block diagram showing a computer system including the memory verification logic of one embodiment.

FIG. 1 is a block diagram showing a system 100 with which one embodiment may be advantageously used. The system 100 is a computer system. Other embodiments, however, are applicable to other types of systems, or to systems configured in a different manner than the system 100.

The computer system 100 includes a bus 105 for communicating information between various system components. A memory subsystem 110 includes a memory controller 115 coupled to the bus 105 and a main memory 125 coupled to the memory controller 115.

The memory subsystem 110 also includes a read only memory (ROM) 135 coupled to the bus 105. A processor 140 is coupled to the memory controller 115 and may be coupled to a second level cache memory 120. The processor 140 of one embodiment is a microprocessor. For other embodiments, however, the processor may be another type of processor such as a microcontroller or an application specific integrated circuit (ASIC) device, for example.

The memory controller 115 includes memory verification logic 130 to verify the integrity of the main memory or another volatile memory in the system 100 as described in more detail below.

A mass storage device 145, one or more input and/or output devices 150, a network interface 155 and other peripherals 160 may also be coupled to the bus 105 for one embodiment. The mass storage device 145 may be a hard disk or compact disc read only memory (CD ROM) drive and associated storage medium, for example. The one or more input and/or output devices 150 may include a keyboard, a monitor and/or a cursor control device.

Figure 2:
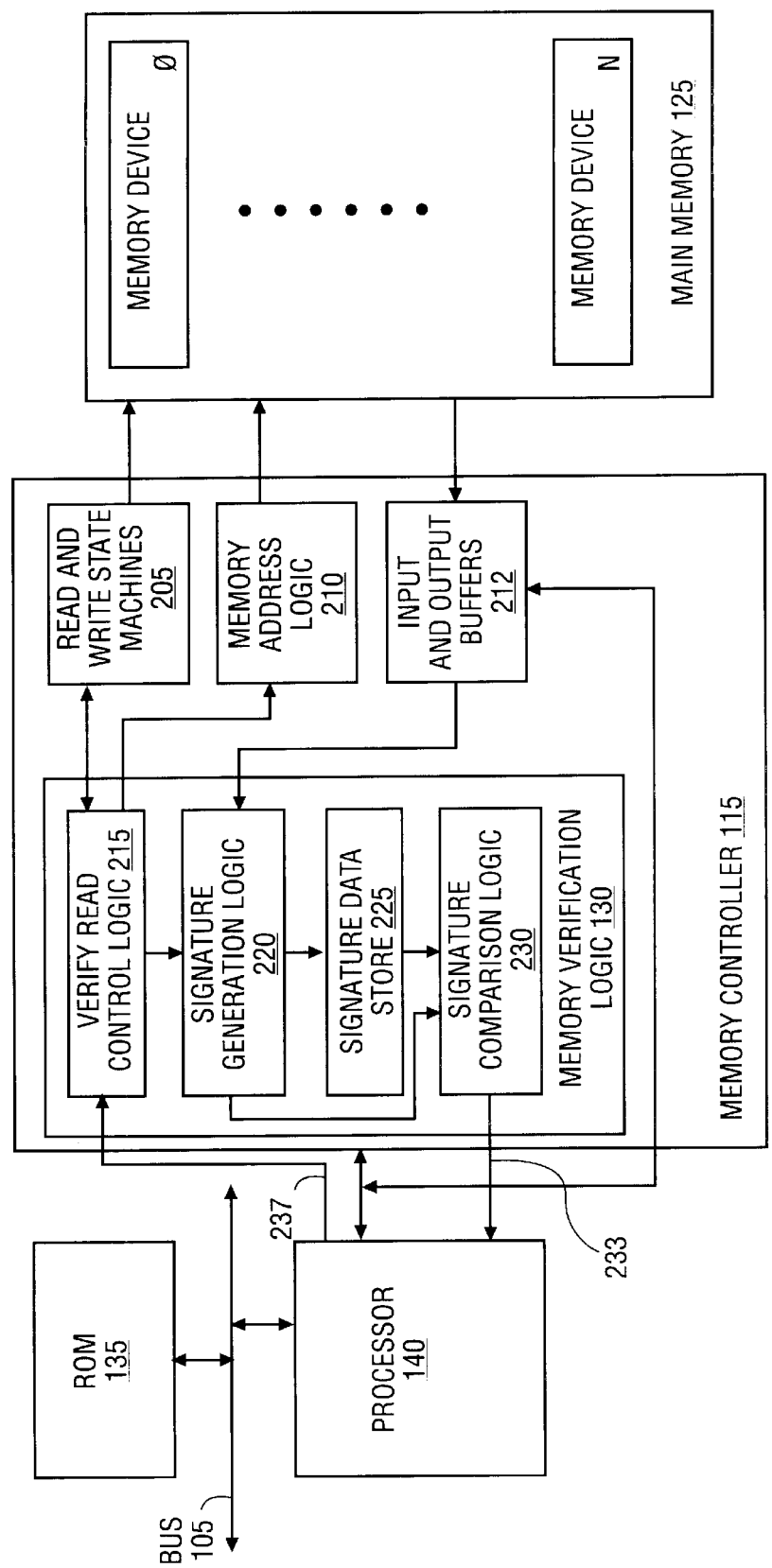
FIG. 2 is a block diagram showing the memory controller and memory verification logic of FIG. 1 in more detail.

FIG. 2 is a block diagram showing the main memory 125 and the memory controller 115 of FIG. 1 in more detail.

The main memory 125 of one embodiment includes multiple dynamic random access memory (DRAM) devices 0-N where N may be any integer greater than 0. For other embodiments, the main memory may include only a single device and/or one or more different types of memory devices.

In addition to the memory verification logic 130, the memory controller 115 of one embodiment includes read and write state machines 205, memory address logic 210, and input and output buffers 212. The memory controller 115 may also include other logic that is not shown in FIG. 2 for purposes of clarity.

The memory verification logic 130 of one embodiment is dedicated memory verification logic that is provided specifically to perform memory verification operations. The memory verification logic 130 includes verify read control logic 215, signature generation logic 220, a signature data store 225, and signature comparison logic 230.

The verify read control logic 215 determines and controls the memory locations to be read from the main memory 125 or other memory to be verified. The number and location of memory cells to be read from the main memory 125 during a verification operation may depend on several factors such as the type of memory devices to be verified, the number of memory devices in the main memory and the amount of time provided for the memory verification process.

For example, to verify the integrity of the main memory 125, it may be desirable to read data from each of the devices 0-N to verify the integrity of each of the devices. Further, it may be desirable to read data from each row and each column in the main memory 125, for example. For some systems, the number of memory locations to be read may need to be reduced to meet verification process time constraints. For other systems, more memory cells may be read during the verification process to provide additional certainty in the verification process.

The signature generation logic 220 is coupled to the verify read control logic 215. The signature generation logic 220 of one embodiment is provided to generate a signature using the data read from the cells of the main memory 125 selected by the verify read control logic 215. The signature may be a checksum or a cyclic redundancy checking (CRC) code, for example. The checksum, CRC code or other signature results from performing a predetermined algorithm or calculation on the data read from the selected memory cells of the main memory 125. Other types of signatures may also be used for various embodiments.

The signature data store 225 is coupled to the signature generation logic 220. The signature data store 225 is provided to store a signature generated by the signature generation logic 220 and is a nonvolatile data store for one embodiment.

Signature comparison logic 230 is coupled to the signature generation logic 220 and to the signature data store 225. The signature comparison logic 230 is provided to compare a second, later-generated signature with the first signature stored in the signature data store 225 as described in more detail below. The signature comparison logic 230 includes an output 233 over which a verify signal is communicated to the processor 140 if the first and second signatures match.

Figure 3:
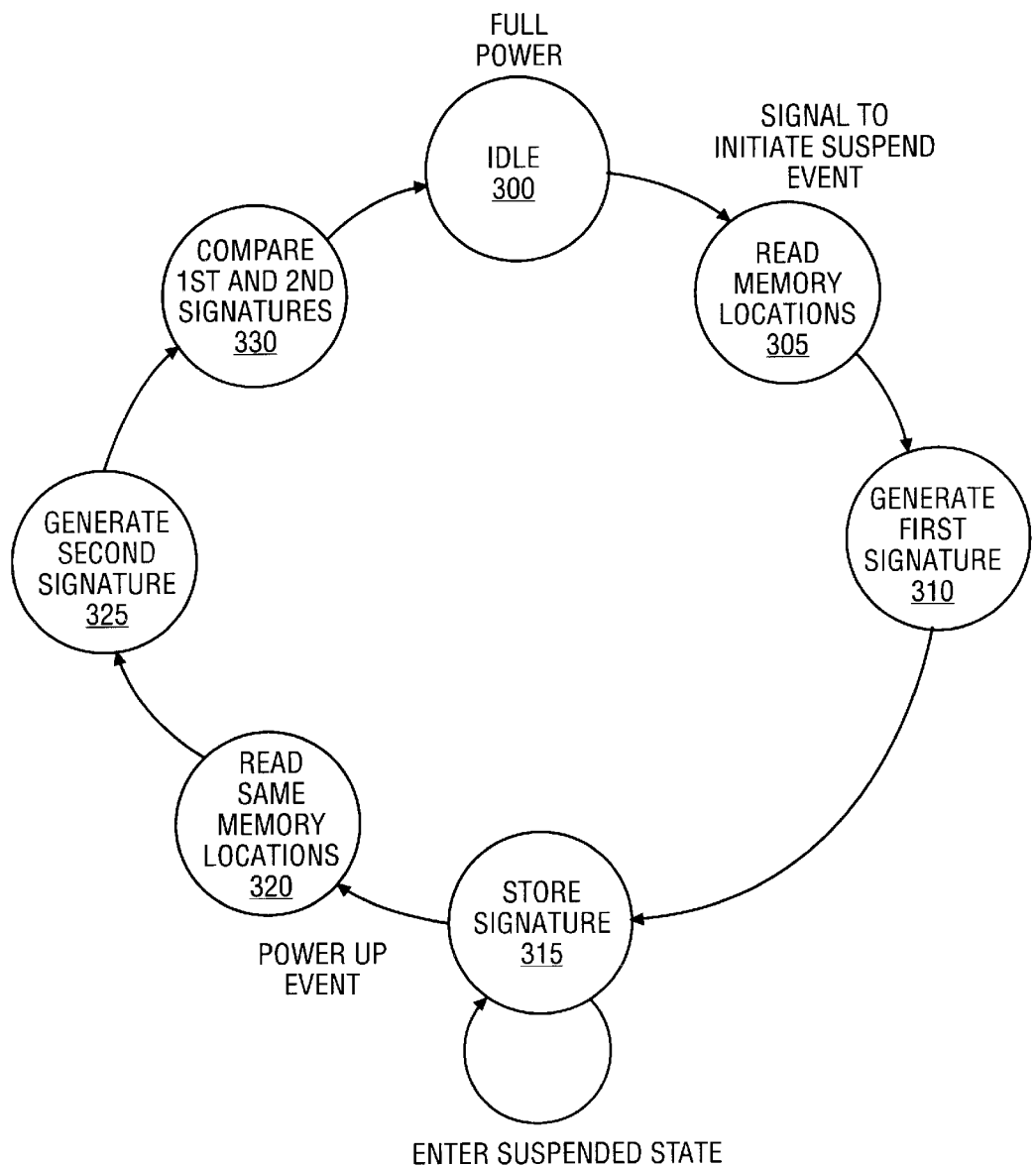
FIG. 3 is a state diagram showing the operation of the memory verification logic of FIGS. 1 and 2.

For one embodiment, the memory verification logic 130 is implemented as a state machine having the states shown in FIG. 3.

The operation of the memory verification logic 130 in the system 100 is described with reference to FIGS. 1, 2 and 3.

The memory verification logic 130 begins in an idle state 300 in which the system 100 is fully powered. Then, in response to a predetermined timeout period or a specific command, for example, a signal from the processor 140 to the memory controller 115 over the bus 237 indicates the initiation of a system suspend event. This signal causes the memory verification logic 130 to transition from the idle state 300 to a state 305 in which data is read from a set of selected, predetermined memory locations of the main memory 125. In this state, the verify read control logic 215 controls the read state machine 205 and the memory address logic 210 to read data from the predetermined memory locations. The data read from the main memory 125 is communicated back to the memory controller 115 through input buffers 212 and to the signature generation logic 220.

Once the data is read from the set of predetermined memory locations of the main memory 125, the memory verification logic 130 transitions to a state 310 in which a first signature is generated. The signature generation logic 220 manipulates the data read from the selected memory locations according to a predetermined algorithm to produce a first signature. The signature of one embodiment is in the form of a checksum, but other types of signatures may also be used.

Once the first signature has been generated, the memory verification logic 130 transitions to a state 315 in which the first signature is stored in the signature data store 225. The signature data store 225 may be any type of memory that receives sufficient power during a suspended state of operation (or between the events that trigger the generation of first and second signatures) to maintain the data stored therein.

Following storage of the first signature in the signature data store 225, the memory verification logic 130 remains in the state 315 during the time that the system 100 is in a suspended system state. The suspended system state may be a state where power to various components in the system 100 is reduced such that the overall power consumed by the system 100 is reduced.

In response to a power-up event or other indication that the system 100 is to exit the suspended state, the memory verification logic 130 transitions to the state 320 in which data is read from the same selected memory cells of the main memory 125 in the same manner as in the state 305. Once completed, the memory verification logic 130 transitions to the state 325 in which the signature generation logic 220 generates a second signature from the selected data read while in the state 320. The second signature is calculated or otherwise generated in the same manner using the same algorithm as was used to generate the first signature. The memory verification logic 130 then transitions to the state 330 in which the first and second signatures are compared.

The signature comparison logic 230 receives the second signature from the signature generation logic 220 and the first signature from the signature data store 225. If the signature comparison logic 230 determines that the first and second signatures match, a verify or match signal is communicated to the processor 140 over the bus 233. The memory verification logic 130 then returns to the idle state 300 until another suspend event is initiated.

While the example above is described in the context of a system suspend or other low power event followed by a power-up event, other types of events and/or commands may be applicable to other embodiments for initiating memory verification. For one embodiment, for example, a user command may initiate the memory verification sequence while the system is fully powered. In this manner, a first signature may be generated from the first memory and stored at a first time prior to performing a particular test, for example. After the test is performed (which may not involve a low power system state or power off sequence), a second signature may be generated in the same manner at a second, later time to determine whether the first memory was corrupted by the test. Other types of events and circumstances where this memory verification capability may be useful will be appreciated by those of ordinary skill in the art.

Figure 4:
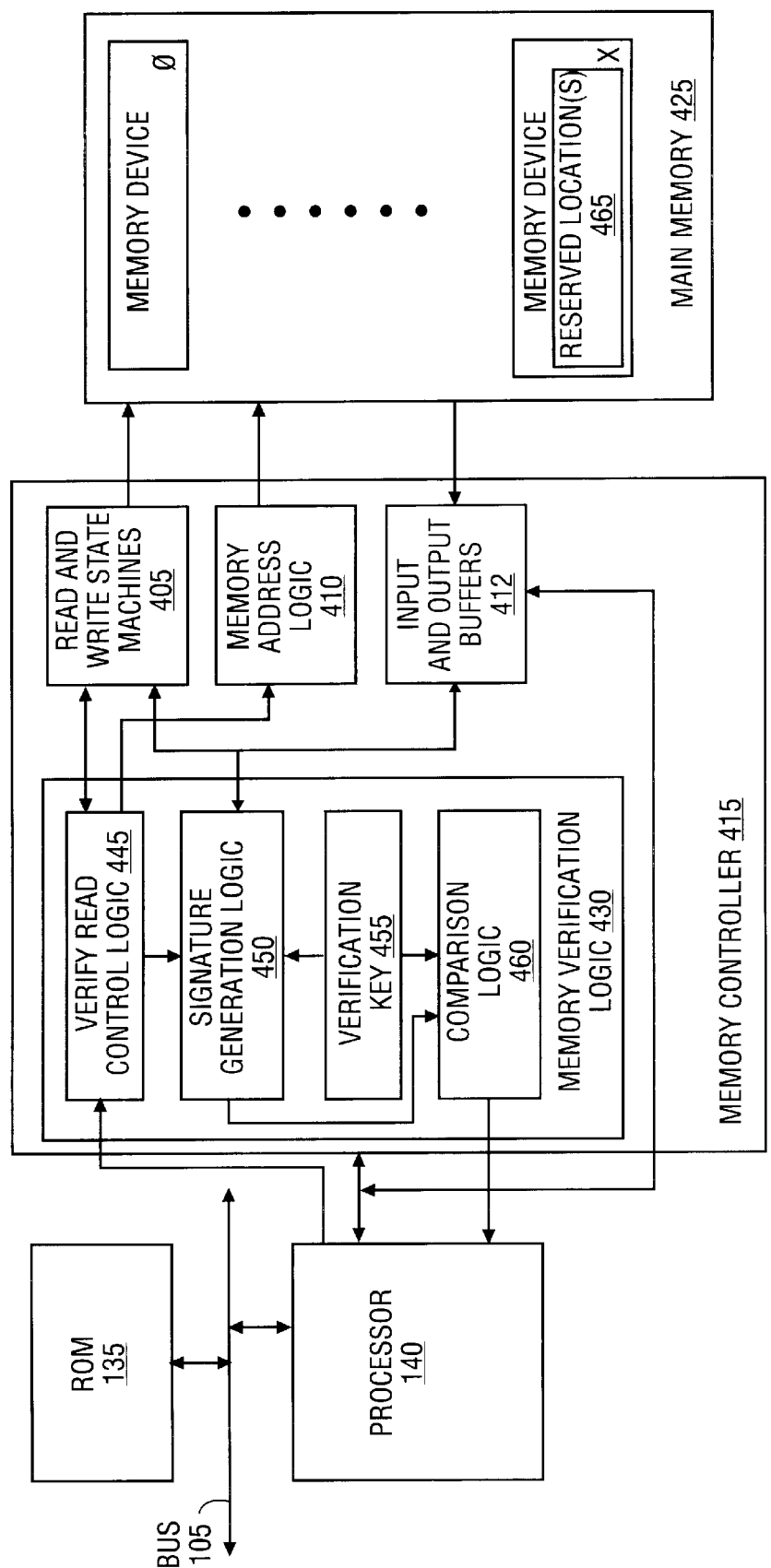
FIG. 4 is a block diagram showing memory verification logic of an alternative embodiment.

FIG. 4 shows a memory controller 415, main memory 425 and memory verification logic 430 of another embodiment. The memory controller 415 and main memory 425 may be used in place of the memory controller 115 and main memory 125 in the system 100, for example.

For the embodiment shown in FIG. 4, the memory verification logic 430 includes verify read control logic 445, signature generation logic 450, a verification key 455, and comparison logic 460. The verification key 455 is a hard-coded or otherwise predetermined value. For one embodiment, the verification key 455 is all ones, however the verification key 455 may be any value for other embodiments.

The verify read control logic 445 performs a similar function in a similar manner to the verify read control logic 215 of FIG. 2.

The signature generation logic 450, however, operates in a different manner than the signature generation logic 220. The signature generation logic 450 first generates a first preliminary signature based on the data read by the verify read control logic 445 from the predetermined memory cells. The signature generation logic 450 then determines a value that, when combined with the preliminary signature in a predetermined manner, results in the verification key 455. The value determined by the signature generation logic 450 is then stored in a reserved location 465 that may be anywhere in the main memory 425.

During a later verification process, the signature generation logic 450 generates a second preliminary signature based on data stored in the same memory locations in the same manner. The second preliminary signature is then combined in the predetermined manner with the value stored in the reserved location 465. The comparison logic 460 compares the result of the combination with the verification key 455 to determine whether data stored in the memory has been corrupted. Other approaches to generating a signature and performing a later comparison may also be used for other embodiments.

Figure 5:
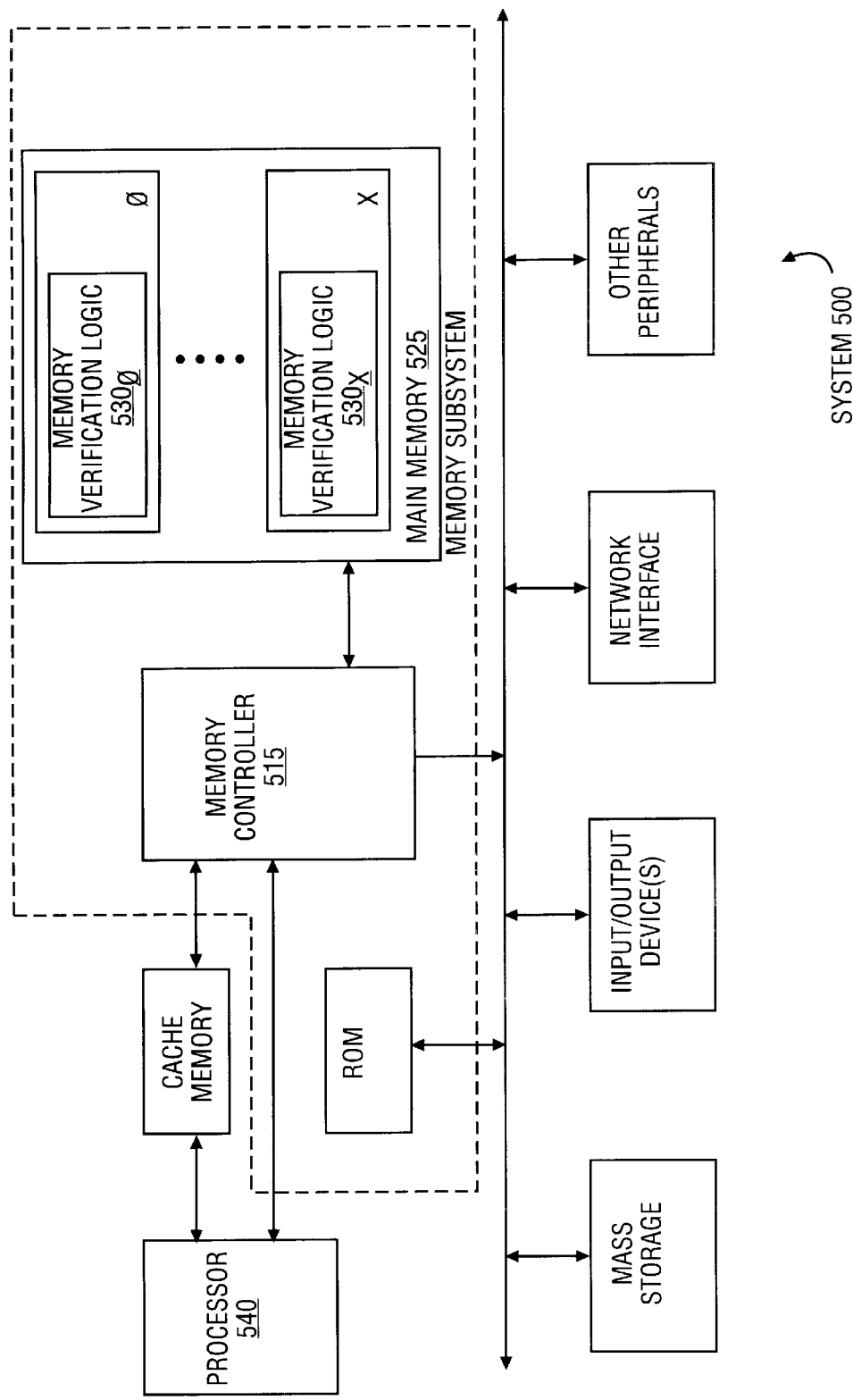
FIG. 5 is a block diagram showing a computer system including memory verification logic of an alternative embodiment for which the memory verification logic is provided on a memory.

FIG. 5 is a block diagram showing a system 500 of another embodiment. The components of the system 500 having similar names to components of the system 100 of FIG. 1 are coupled in a similar manner and perform similar functions with the exceptions discussed below.

For the system 500, memory verification logic 530 is provided within a main memory 525. The memory verification logic 530 may be similar to the memory verification logic 130 of FIGS. 1, 2 and 3 or to the memory verification logic 430 of FIG. 4, for example.

For one embodiment, the main memory 525 includes multiple DRAM devices 0-X where X can be any integer greater than 0. For this embodiment, memory verification logic 530 is provided on each of the devices 0-X. The memory verification logic 530 operates in a similar manner to either the memory verification logic 130 or the memory verification logic 430 to verify that data stored in a corresponding memory device has not been corrupted. In this manner, each of the memory devices 0-X can be considered to be self-verifying.

For example, prior to entering a suspended or other low power system state, or in response to another predetermined event, such as a user command, for example, each of the memory verification logic units $530_0$-$530_X$ reads data from selected memory locations of the corresponding device. Each of the memory verification logic units $530_0$-$530_X$ then calculates a first signature or value (depending on the type of memory verification logic used) and stores the signature or value appropriately as described above. Upon exiting the suspended state, or in response to a second predetermined event, each of the memory verification logic units $530_0$-$530_X$ then reads the same locations from the corresponding memory devices 0-X, respectively, performs the same manipulation or calculation to generate a signature and then determines whether data stored in the corresponding memory device has been corrupted.

For one embodiment, if all of the memory devices 0-X are verified and determined not to be corrupted, a verify signal is communicated through the memory controller 515 to the processor 540 and operation of the system 500 proceeds normally. If one or more of the memory devices 0-X is determined to have experienced data corruption, an error signal is communicated through the memory controller 515 to the processor 540. The verify and error signals may be opposite states of the same signal for one embodiment.

Where the main memory 525 includes multiple types of memory devices, the memory verification logic 530 provided on each of the memory devices may perform memory verification in a different manner that is specific to the type of device to be verified. For example, for one type of memory device it may be important to read data from a first pattern of memory cells based on the type of corruption that is most likely to occur for that particular device. For another type of memory device, it may be important to read data from a different pattern of memory cells.

For other embodiments, memory verification logic may be responsive to a specific command or an event other than a system suspend event to start a memory verification operation. Further, for other embodiments, the signal to start a memory verification operation may be communicated to the memory verification logic by a source other than a processor. Also, the dedicated memory verification logic of an alternative embodiment may be located on a different device in the memory subsystem or may be configured on a standalone device.

While a checksum and CRC code have been provided as examples of signatures that may be used for memory verification, other types of signatures and/or indicators of the data stored in a memory at a given time may also be used in accordance with various embodiments.

The embodiments described above provide dedicated memory verification logic such that a memory verification process can be performed quickly. For some systems, a faster memory verification process may provide for a more thorough memory verification process while still meeting a given time constraint.

Another feature provided by the dedicated memory verification logic of one or more embodiments is that the memory verification process can begin before a system processor is reset following a suspended system state.

The above-described embodiments provide the additional advantage that a verify or match signal resulting from a successful memory verification process can be used to direct a processor, once it is reset, to execute from the verified main memory instead of from a ROM. In this manner, if the datapath between the processor and the main memory is wider than the datapath between the processor and the ROM, execution speed may be increased.

Figure 6:
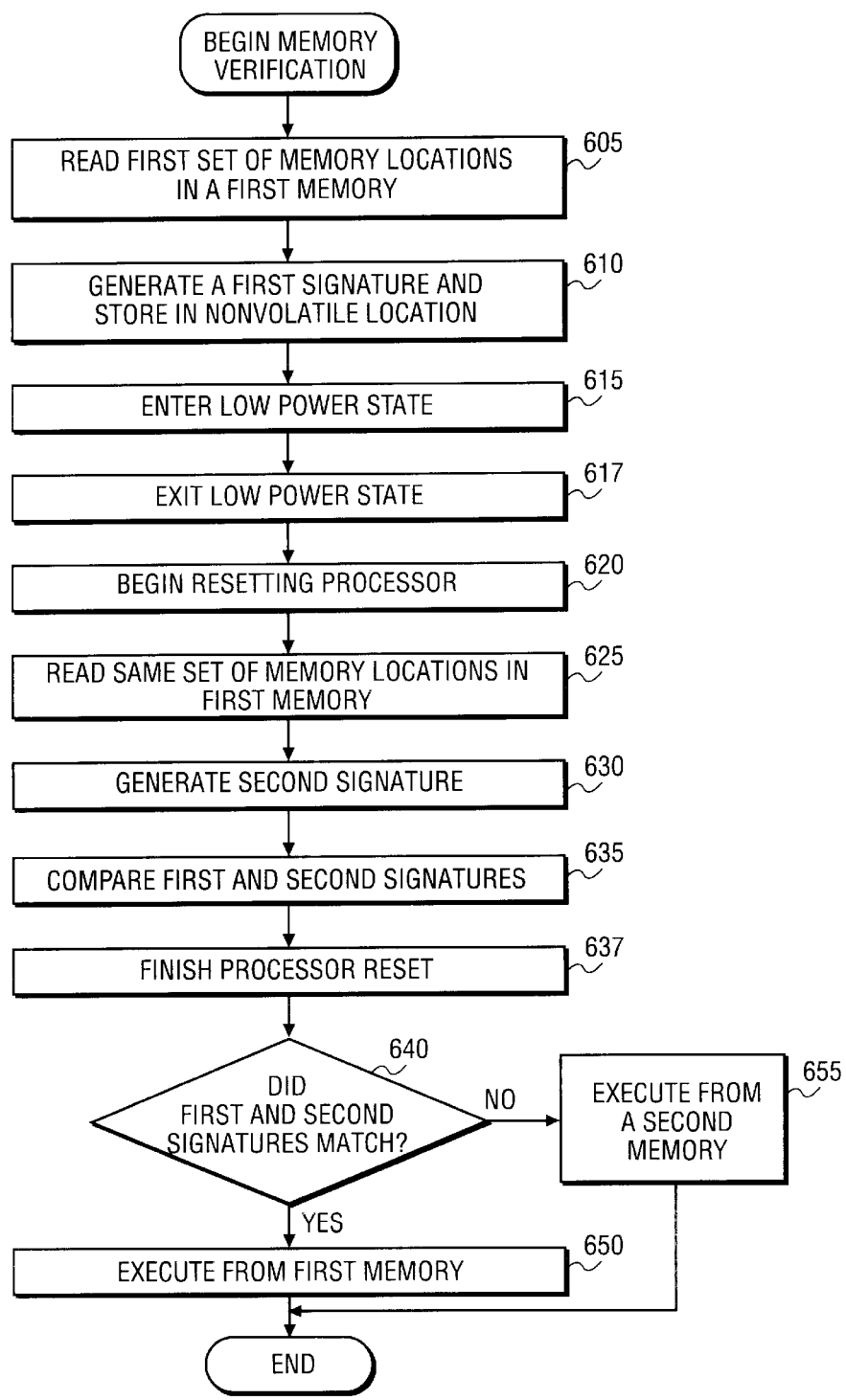
FIG. 6 is a flow diagram showing the memory verification method of one embodiment.

FIG. 6 is a flow diagram showing the memory verification method of one embodiment. At step 605, a first set of memory locations in a first memory is read and at step 610, a first signature or other indication of the data read at step 605 is generated and stored in a nonvolatile memory location. At step 615, the system including the first memory enters a low power state.

In step 617, based on a triggering or other event, the system begins to exit the low power state or "wake up." Between the time a processor in the system including the first memory begins a reset sequence in step 620 and the processor reset sequence is completed in step 637, one or more of the steps 625–630 is begun. At step 625, the same set of memory locations read at step 605 are read a second time. A second signature or other indicator is generated in step 630 in the same manner as the first signature using the data read at step 625. The first and second signatures or indicators are then compared at step 635. The steps 625–630 that are not completed before the processor is fully reset in step 637 are completed after the processor is fully reset.

At decision block 640, it is determined whether the first and second signatures match. If so, then at step 650, the processor is directed to begin executing from the first memory. If not, then at step 655, the processor is directed to execute from a second memory. For one embodiment, the second memory is a non-volatile memory such that its state is not lost during a power down or low power sequence.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An integrated circuit device comprising:
   dedicated memory verification logic to compare data read from a set of cells in a memory at a first time to data read from the same set of memory cells at a second time, wherein the memory verification logic comprises a state machine.

2. The integrated circuit device of claim 1 wherein the first time is prior to a time that a system including the memory enters a suspended state and the second time is following the time that the system enters the suspended state and prior to a time that a processor in the system is reset.

3. The integrated circuit device of claim 1 wherein the first time is in response to a first user command and the second time is in response to a second user command.

4. The integrated circuit device of claim 1 wherein the set of cells includes all cells of the memory.

5. A self-verifying memory comprising:
   memory verification logic to compare a portion of the contents of a memory at a first time to the same portion of the memory contents at a second time, wherein the memory verification logic comprises a state machine.

6. The self-verifying memory of claim 5 wherein the memory verification logic includes
   signature generation logic to perform an algorithm on the portion of the contents at the first time to produce a first result, the signature generation logic to perform a same algorithm on the portion of the contents at the second time to produce a second result, and
   signature comparison logic coupled to the signature generation logic to compare the first result to the second result, the signature comparison logic to output a verify signal if the first result matches the second result.

7. The self-verifying memory of claim 6 wherein the second time is following a suspended system state and the first time is prior to the system entering the suspended state.

8. The self-verifying memory of claim 6 wherein the algorithm is a checksum algorithm.

9. A memory controller comprising:
   memory read control logic to control reading data from selected cells in a memory; and
   memory verification logic coupled to the memory read control logic, the memory verification logic to verify that data read from the selected cells at a first time prior to a system entering a suspended state matches data read from the selected cells at a second time following the suspended system state.

10. The memory controller of claim 9, wherein the memory verification logic includes
    signature generation logic to perform an algorithm on the data read at the first time to produce a first result, the signature generation logic to perform a same algorithm on the data read at the second time to produce a second result, and
    signature comparison logic coupled to the signature generation logic to compare the first result to the second result, the signature comparison logic to output a verify signal if the first result matches the second result.

11. The memory controller of claim 10 wherein the algorithm is a checksum algorithm.

12. A system comprising:
    a bus;
    a processor; and
    a memory subsystem coupled to the bus and to the processor, the memory subsystem including
       a first volatile memory, and
       dedicated memory verification logic coupled to the first volatile memory, the dedicated memory verification logic to compare data read from a set of cells in the first volatile memory at a first time to data read from the same set of memory cells at a second time.

13. The system of claim 12 wherein the memory subsystem further includes a memory controller and wherein the dedicated memory verification logic is configured on the memory controller.

14. The system of 12 wherein the memory verification logic is responsive to a system suspend event and wherein the first time is before the system enters a suspended state and the second time is after the system exits the suspended state.

15. The system of claim 12 wherein the memory verification logic includes signature generation logic to perform an algorithm on the data read at the first time to produce a first result, the signature generation logic to perform a same algorithm on the data read at the second time to produce a second result, and signature comparison logic coupled to the signature generation logic to compare the first result to the second result, the signature comparison logic to output a verify signal if the first result matches the second result.

16. The system of claim 15 wherein the algorithm is a checksum algorithm.

17. The system of claim 12 wherein the first volatile memory includes multiple memory devices and wherein the memory verification logic is configured on each of the multiple memory devices.

* * * * *